United States Patent
Lindgren

(10) Patent No.: US 11,932,492 B2
(45) Date of Patent: Mar. 19, 2024

(54) AQUACULTURE NET CLEANER TRACK BELT

(71) Applicant: Peter B. Lindgren, Pompano Beach, FL (US)

(72) Inventor: Peter B. Lindgren, Pompano Beach, FL (US)

( * ) Notice: Subject to any disclaimer, the term of this patent is extended or adjusted under 35 U.S.C. 154(b) by 571 days.

(21) Appl. No.: 17/168,641

(22) Filed: Feb. 5, 2021

(65) Prior Publication Data
US 2021/0245205 A1 Aug. 12, 2021

Related U.S. Application Data

(60) Provisional application No. 62/971,341, filed on Feb. 7, 2020.

(51) Int. Cl.
| | |
|---|---|
| *B65G 17/00* | (2006.01) |
| *B08B 1/00* | (2006.01) |
| *B62D 55/00* | (2006.01) |
| *B62D 55/20* | (2006.01) |
| *B62D 55/21* | (2006.01) |
| *B62D 55/27* | (2006.01) |
| *B62D 55/28* | (2006.01) |

(52) U.S. Cl.
CPC .............. *B65G 17/00* (2013.01); *B08B 1/008* (2013.01); *B62D 55/00* (2013.01); *B62D 55/202* (2013.01); *B62D 55/21* (2013.01); *B62D 55/27* (2013.01); *B62D 55/283* (2013.01)

(58) Field of Classification Search
CPC ........ B08B 1/02; B65G 17/06; B65G 17/063; B65G 17/067; B65G 17/068

USPC ....... 198/844.1, 848, 850–853; 474/204, 206
See application file for complete search history.

(56) References Cited

U.S. PATENT DOCUMENTS

| 5,375,640 | A | | 12/1994 | Harms | |
| 5,697,490 | A | * | 12/1997 | Raque | B65G 17/42 198/470.1 |
| 5,706,934 | A | * | 1/1998 | Palmaer | B65G 17/08 198/840 |
| 6,264,294 | B1 | * | 7/2001 | Musselman | B62D 55/26 305/178 |
| 6,571,935 | B1 | * | 6/2003 | Campbell | B65G 15/42 198/821 |
| 6,913,329 | B1 | | 7/2005 | Rodgers et al. | |
| 7,367,447 | B1 | * | 5/2008 | Harrison | B65G 17/08 198/850 |

(Continued)

FOREIGN PATENT DOCUMENTS

CA 2433911 C * 1/2009 ............ B62D 55/21

*Primary Examiner* — Leslie A Nicholson, III
(74) *Attorney, Agent, or Firm* — McHale & Slavin, P.A.

(57) ABSTRACT

A drive system for a net cleaner to produce efficient propulsion without damage to the cage net. The drive system includes flexible engagement stumps protruding from a base of a driving belt with tips or studs mounted on an end of the stumps. The tips or studs engage the net and propel the net cleaner. The stumps flex to insure that. if excessive pressure is applied to a stud, the stump will bend and the net will release without damage. A guard prevents the stump from directly engaging a cage net. A track belt produces efficient propulsion without damage to the cage net. The track belt includes flexible engagement stumps protruding from a base of a driving belt with tips or studs mounted on an end of the stumps.

21 Claims, 16 Drawing Sheets

(56) References Cited

U.S. PATENT DOCUMENTS

| | | | |
|---|---|---|---|
| 9,174,711 B2 | 11/2015 | Sivertsen | |
| 9,878,750 B2 | 1/2018 | Leblanc et al. | |
| 10,427,736 B2 * | 10/2019 | Blackburn | B62D 55/28 |
| 10,993,374 B2 * | 5/2021 | Craig | B08B 1/006 |
| 2003/0006646 A1 * | 1/2003 | Musselman | B62D 55/28 |
| | | | 305/180 |
| 2012/0260443 A1 * | 10/2012 | Lindgren | A46B 13/02 |
| | | | 15/77 |
| 2014/0234573 A1 * | 8/2014 | Lindgren | B29C 45/0055 |
| | | | 264/235.6 |

* cited by examiner

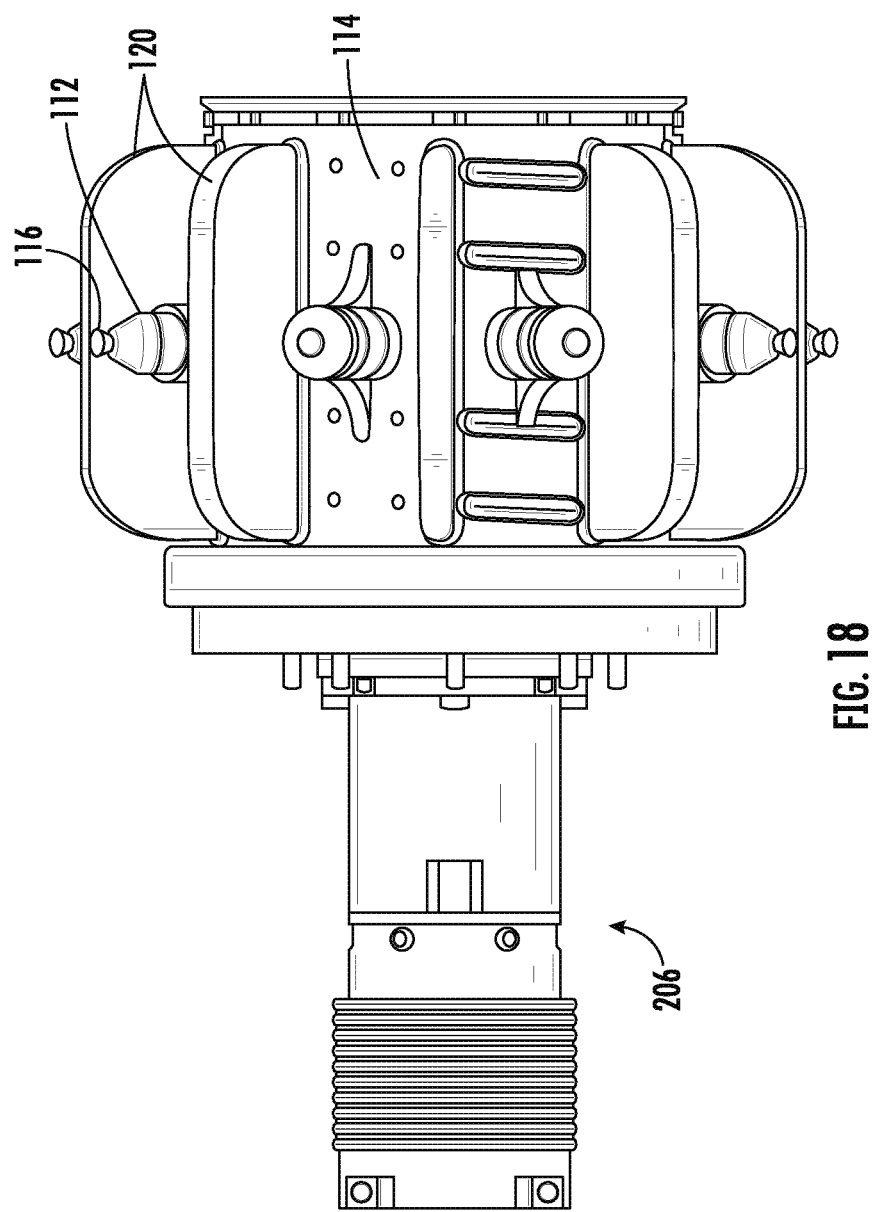

AQUACULTURE NET CLEANER TRACK BELT

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/971,341, entitled "AQUACULTURE NET CLEANER TRACK BELT", and filed Feb. 7, 2020; the contents of which are incorporated herein by reference.

FEDERALLY SPONSORED RESEARCH OR DEVELOPMENT

Not Applicable

FIELD OF THE INVENTION

This invention is related to the field of open ocean aquaculture and, in particular, to improvements in a track belt for cleaning nets used in aquaculture.

BACKGROUND OF THE INVENTION

The offshore fish farming industry has continued to grow, fueled by advancements in aquaculture processes. Unfortunately, such advancements have created, or enhanced, various fish farming problems. A most notable problem is sea lice now found on farm raised salmon fish; sea lice infestation has increased as much as ten-fold in some areas. Further, the spread of sea lice is occurring from farm to farm, which further accelerates the infestation. Cleanliness of the net that forms the fish cage has been recognized as a significant contributor to the problem. Studies have also shown that better water flow with clean nets results in more oxygenated water into the cage. With proper oxygenation, the fish eat better, are healthier, grow quicker, and are less susceptible to the sea lice infestation. For this reason, cleaning of a cage in some areas has increased from a few times a year to several times a month. It has also been recognized that the cleaning of the bottom of the cage, previously neglected due to the difficulty in cleaning the bottom, is extremely beneficial. However, hand cleaning nets on a regular schedule can be problematic due to weather conditions.

Various mechanical net cleaners exist in the industry. For instance, a commonly used net cleaner system employs high pressure water and thrusters operated by remote control from a vessel using a video monitor to view the operation. However, these systems require large vessels so they are able to address the net cleaning demands in poor weather conditions; and, while effective, the use of high pressure water and thrusters is inefficient.

Flat track belts use on ROV's (remote operated vehicles) are known in the industry and used to produce articulated movement of a cleaning head. However, all known track belts lack traction and conventional grippers risk tearing the net, which would allow fish to escape, or predators to enter the tear in the net. Further complicating the net cleaning process is equipment in the net that must be avoided during cleaning. Equipment installed in the bottom of the cages can include fish mortality removal systems, systems that improve water flow, and shelters for cleaner fish used to eat sea lice off the salmon.

Examples of ROV's used with underwater net cleaning systems include: Yanmar Osterbo, Speere, NetRobot Morenot, Stealth Cleaner, and MPI. All such systems employ water thrusters or flat belts with high pressure water cleaning.

Flat belts, tires and tracks are known in the prior art for special use and performance applications, and may be found on cars, trucks, excavators, crawlers, snow mobiles and all-terrain vehicles. For instance, Harms, U.S. Pat. No. 5,375,640, discloses a tire for an ATV that includes a long and a short lug and additional lugs in the shape of a frustum of a pyramid or cone to provide traction in deep mud or sand.

Rodgers, U.S. Pat. No. 6,913,329, discloses an endless vehicular rubber track made with improved rubber composition, also showing a common track and sprocket design.

Sivertsen, U.S. Pat. No. 9,174,711, discloses a system for maneuvering cleaning apparatus for removing fouling from marine installations including an improved jet nozzle.

Blackburn, U.S. Pat. No. 10,427,736, discloses a tungsten carbide threaded stud wear resistant member and method to produce for a drive track or belt.

LeBlanc, U.S. Pat. No. 9,878,750, discloses shapes for the inside or driven side of a continuous belt. The current invention technology is used to propel from the outside of a track on a net.

Tire construction is often reinforced with belts of nylon, steel or other high tensile material to control stretching of the elastomer or creep. The reinforcing belt is commonly a continuous length with several revolutions overlapping to form an endless assembly. On conveyor and other belts formed from segments, the segment attachment is usually a metal gripping assembly on each end of a segment with a rod inserted between the ends of the segments to form a continuous loop. Belts commonly have a tightening means to adjust the tension. Belt failure is usually at the attachment.

Previous developments for track belts or wheel traction do not address the problems for applications on an offshore fish cage. Several net cleaners have been developed with brushes, elastomeric hooks and other cleaning features, but they also are not suitable for advancing a net cleaner to suitable speeds and safety.

What is lacking in the industry is a track belt specifically designed for use with a net cleaner to provide a highly articulated propulsion system that will not damage a net.

SUMMARY OF THE INVENTION

Disclosed is an improved track belt drive system for use with a net cleaner. The track belt provides secure propulsion and a high degree of articulation so as to allow efficient navigation of a net being cleaned without damage to the net. The track belt includes elastic engagement stumps protruding from a base of the belt, with studs mounted on an extended end of the stumps used to engage the net and propel the net cleaner. The stumps flex to insure that, if excessive pressure is applied to the stud, the stump will bend and the net will release without damage. A guard limits the stump engagement level and prevents the stumps from tearing the net. The track belt is formed in segments with continuous reinforcing made possible by placement of belt reinforcements in molded segments under tension in a way that the belt reinforcements will not fail at the intersection of the adjoining segments.

An objective of the invention is to disclose a track belt drive system for a net cleaner that is efficient and will not damage a net.

Still another objective is to provide a track belt that will not lead to fish mortality or fish escapes.

Another objective of the invention is to teach a method of making track belt segments wherein reinforcing is performed in a mold under tension.

Still another objective of the invention is to provide a track belt drive system that can be used on nets having openings as large as 5 inches.

Still another objective of the invention is to provide stump and stud design features that can change to accommodate different nets to be cleaned.

Yet another objective of the invention is to provide a track belt drive system that can be adjusted for speed, force, and maneuverability, providing reliability and low maintenance to a net cleaning system.

An advantage of the invention is to provide a track belt formed from segments which provide positive control without being too aggressive.

Other objectives and further advantages and benefits associated with this invention will be apparent to those skilled in the art from the description, examples and claims which follow.

BRIEF DESCRIPTION OF THE DRAWINGS

FIG. 18 is an end view of the mounted track belt.

DETAILED DESCRIPTION OF THE PREFERRED EMBODIMENT

Figure 1:
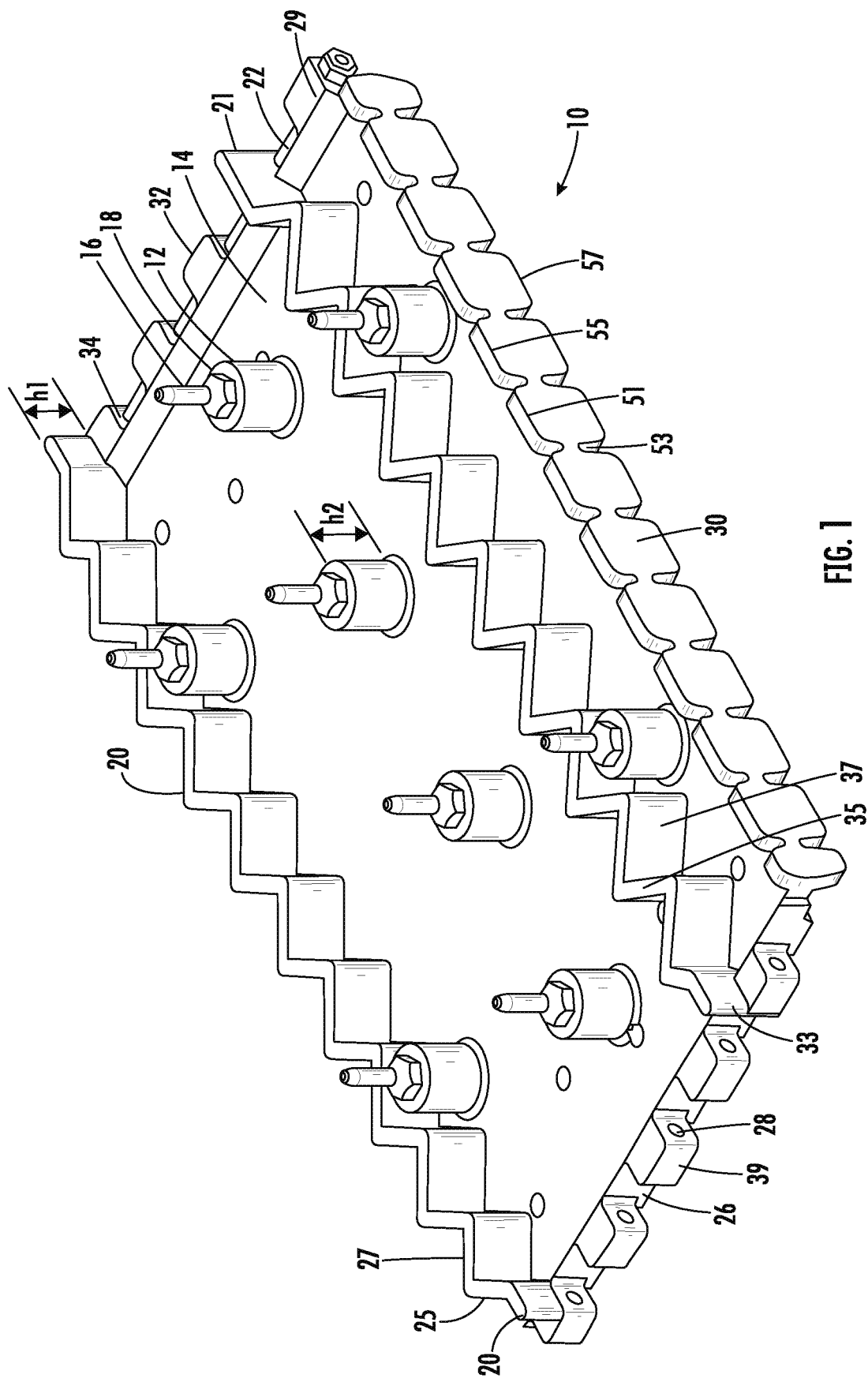
FIG. 1 is a perspective view of a track belt segment of the instant invention.

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the figures in general, the drive system consists of a track belt formed from segments 10, wherein a plurality of segments 10 are coupled together to form a track belt. Each segment 10 employs elastic engagement stumps 12 protruding from a base member 14 with studs 16 protruding from a distal end 18 of each of the stumps 12. The base member 14 uses the elastomeric stumps 12 to advance the net cleaning machine by being flexible, eliminating the chance of tearing the net when used in conjunction with guards 20, 21. The stumps 12 engage a net, not shown, providing underwater traction to propel a net cleaner employing the track belt. The stumps 12 flex to insure that, if excessive pressure is applied to a stud 16, the stump 12 will bend and the net will release without damage. The guards 20, 21 provide spacing to prevent the stumps 12 from entangling the net that forms the fish cage.

In an embodiment, each stump 12 is produced from 70 to 90 A shore durometer polyurethane, and will flex at a design load to prevent net damage. The guards 20, 21 protruding from the base member 14 of the belt segment 10 have approximately the height h1 equal to the height h2 of each stump 12, less the stud prevents the net from entering a position lower than the stump 12 to assure higher than design loads cannot be transferred to the net. Features are attached to, or produced with, the stump top distal end 18 may be elastomeric, metal, plastic or other suitable stud 16 features to engage and act to give traction. In an embodiment, the studs 16 can be made of various shapes, and the guards 20, 21 may be segmented or continuous. If the guards 20, 21 are continuous, excessive stiffness can be avoided by the use of a zigzag shape, such as depicted on guard 20 having alternating facing walls 25, 27 and guard 21 having alternating facing walls 35, 37.

A first end wall 26 includes a plurality of connectors 39, each having an aperture for receipt of a pin. Second end wall 29 includes a plurality of offset connectors 32 with an aperture 34 to receive a pin 22 for adjoining another segment 10, the pin 22 releasably secured by a fastening nut 24.

The edge of the base member 14 has a track guide 30, having a plurality of peaks 51 and valleys 53 defined from a top edge 55 and a bottom edge 57 which interface with teeth, not shown, on the drive wheel 206.

Figure 2:
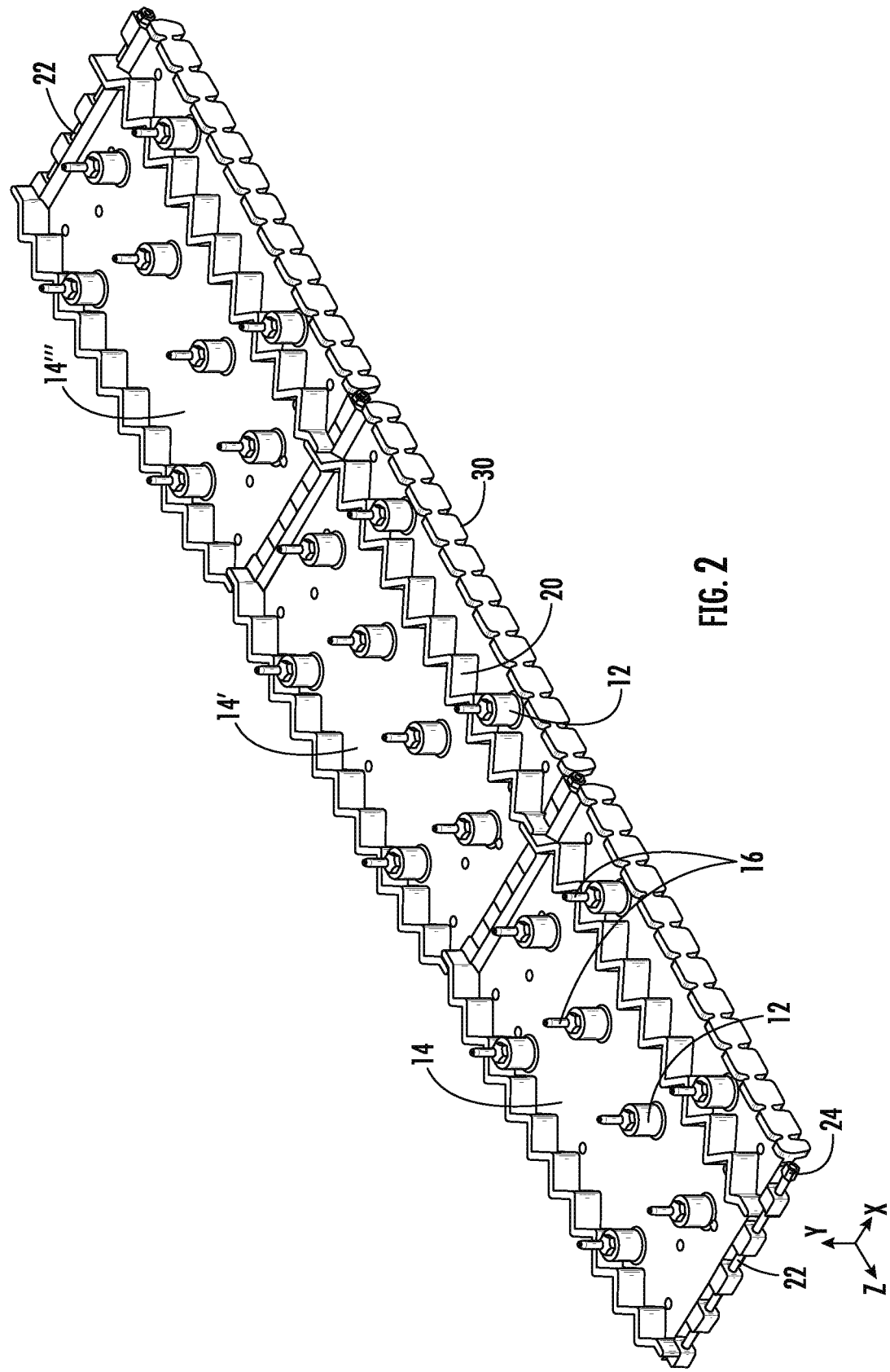
FIG. 2 is a perspective view of a plurality of track belt segments coupled together.
Figure 3:
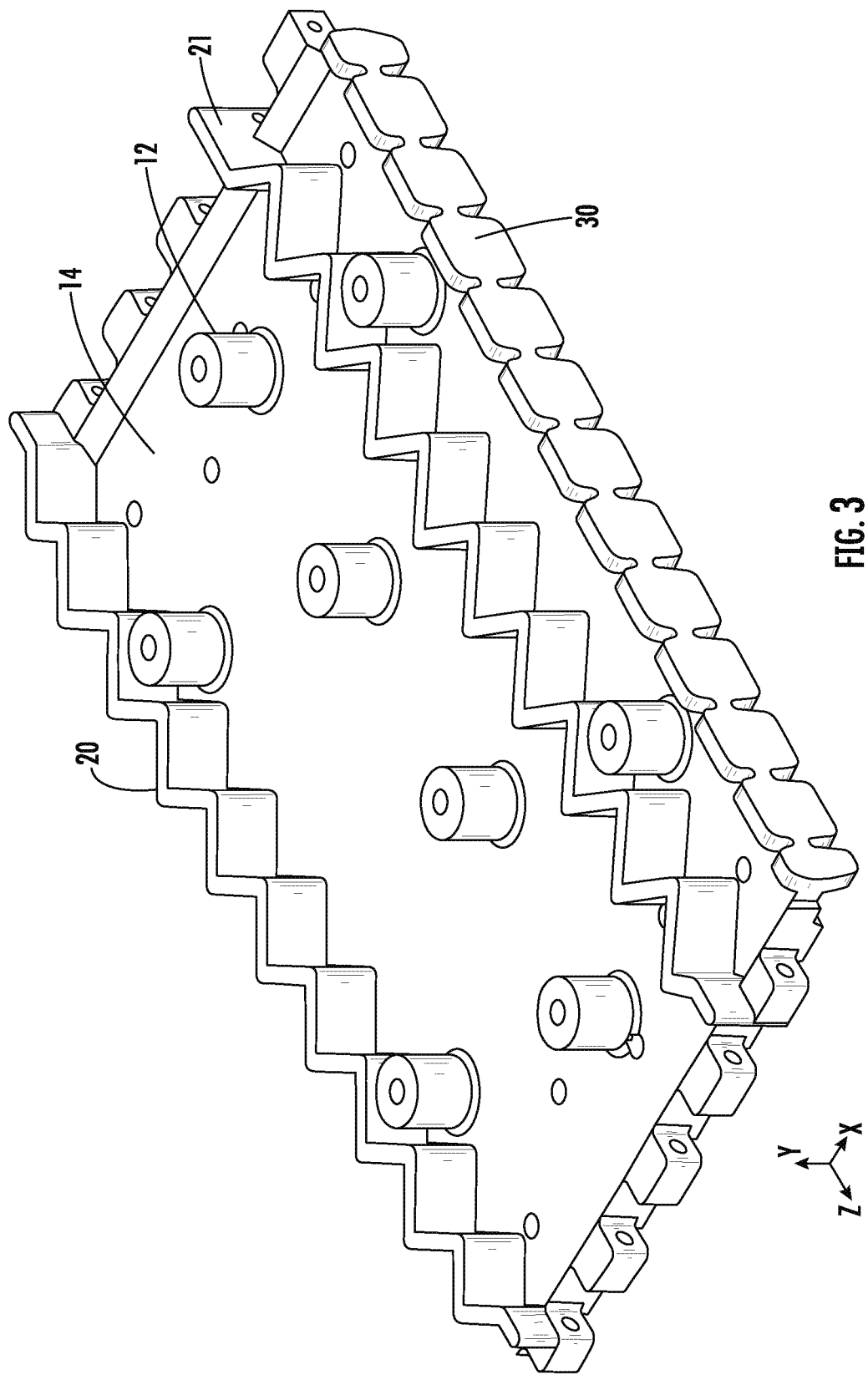
FIG. 3 is a perspective view of a track belt segment without studs.
Figure 15:
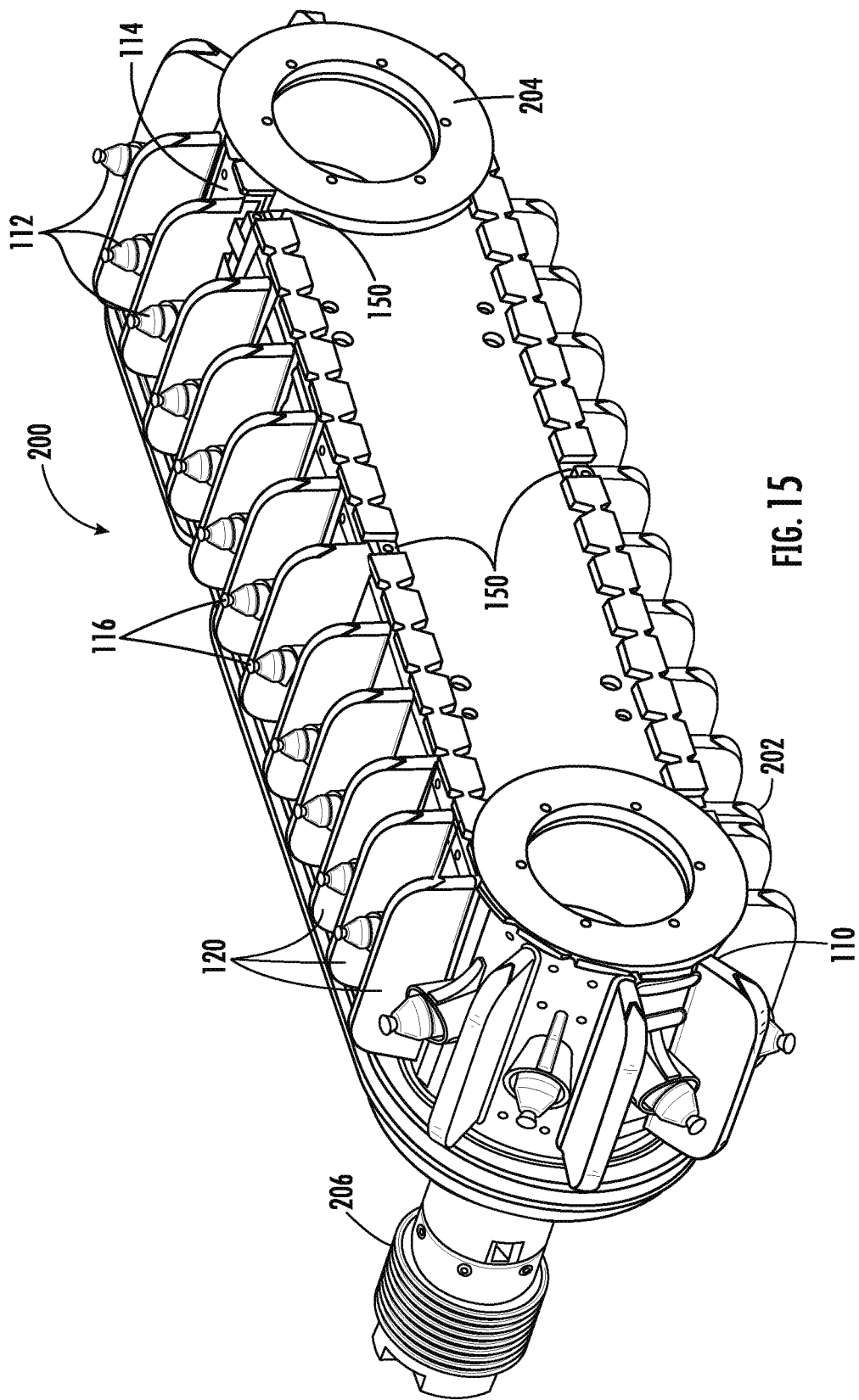
FIG. 15 is a front right perspective view of a mounted track belt.
Figure 16:
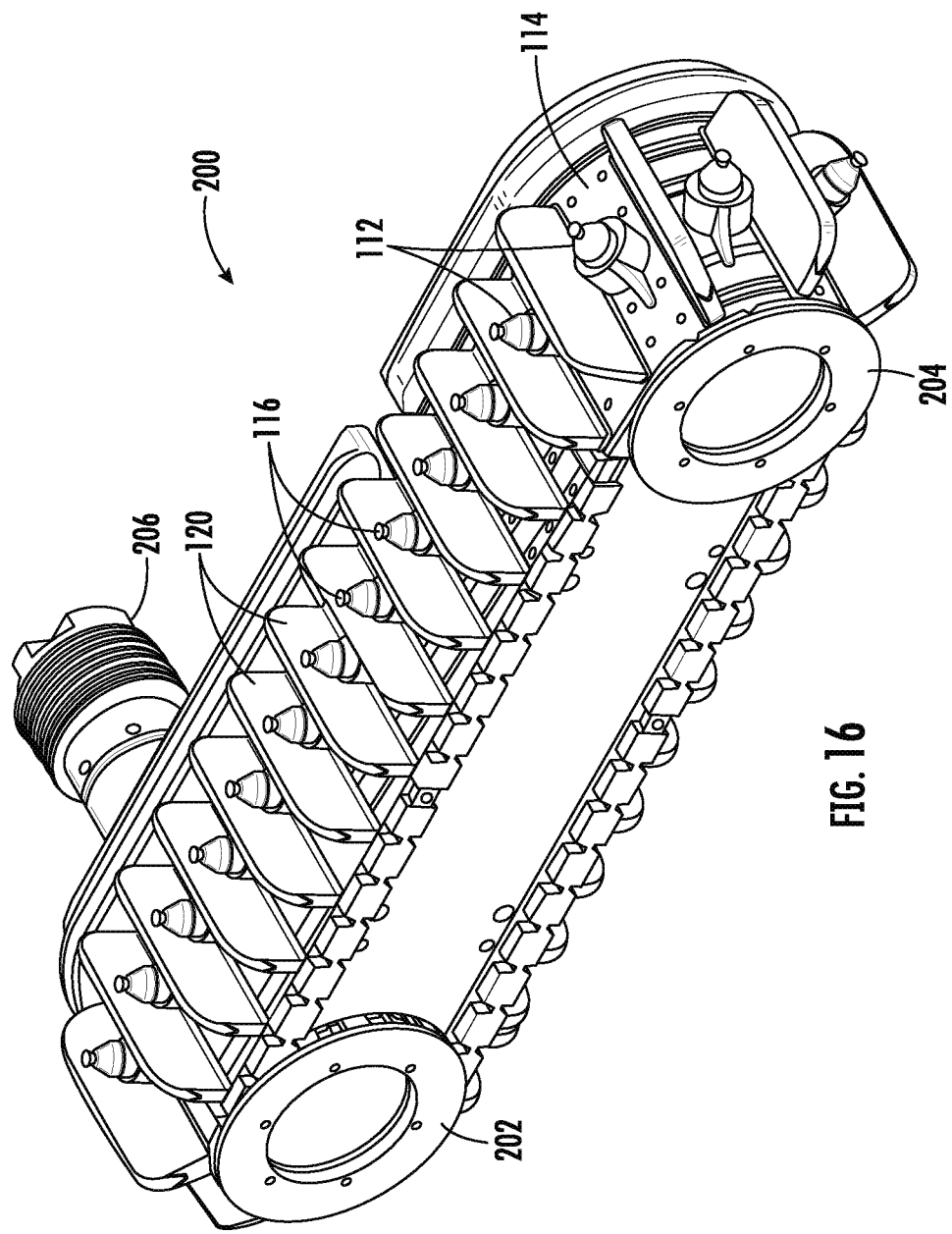
FIG. 16 is a front left perspective view thereof.
Figure 17:
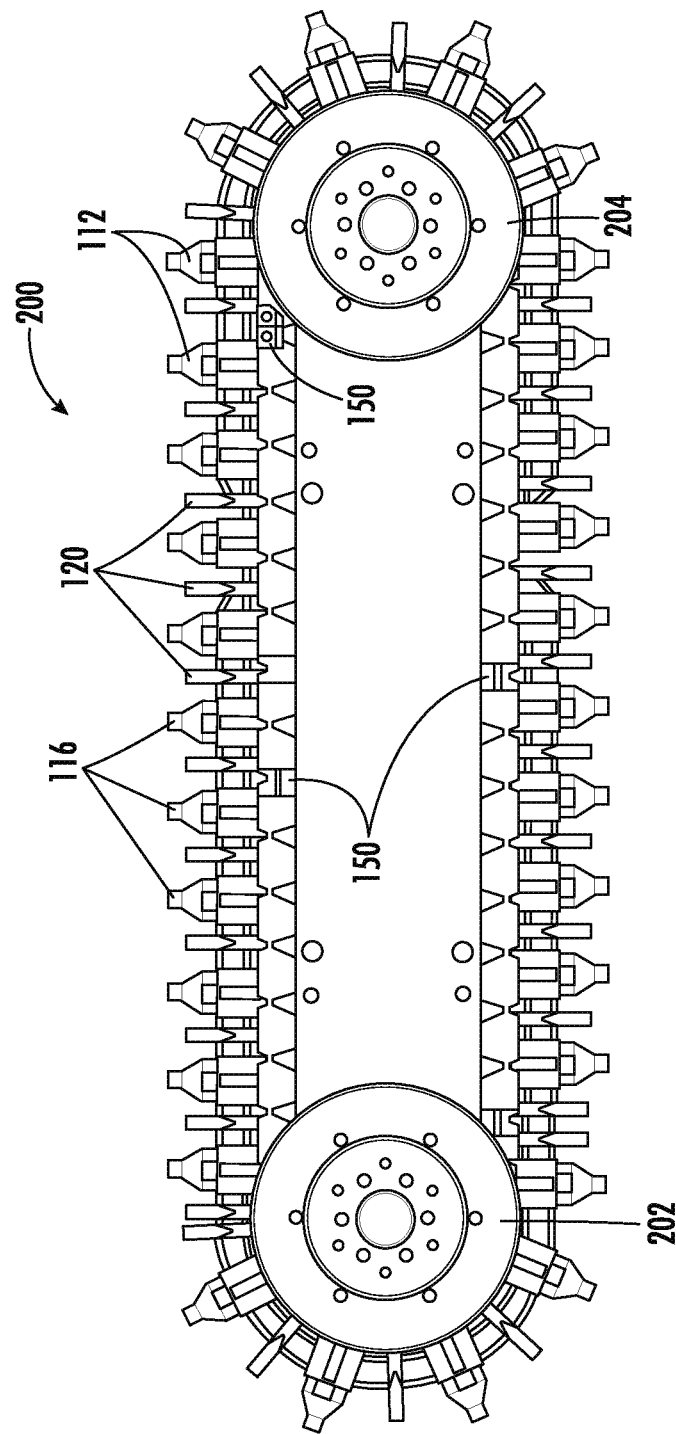
FIG. 17 is a side view thereof.

The base member 14 is produced with molded elastomer sections, having between a 70 to 90 A shore durometer, which are hingedly coupled with adjoining base members by a series of connectors 39 and offset connectors 32. As illustrated in FIG. 2, adjoining base members 14 and 14' are coupled together with a pin 22 placed through the connectors and held in place by the nut 24. Another base member 14'' can be coupled to the adjoining base 14' and so forth, so as to produce a continuous track belt. The track belt is driven by a drive wheel 206, as illustrated in FIGS. 15-17.

Figure 5:
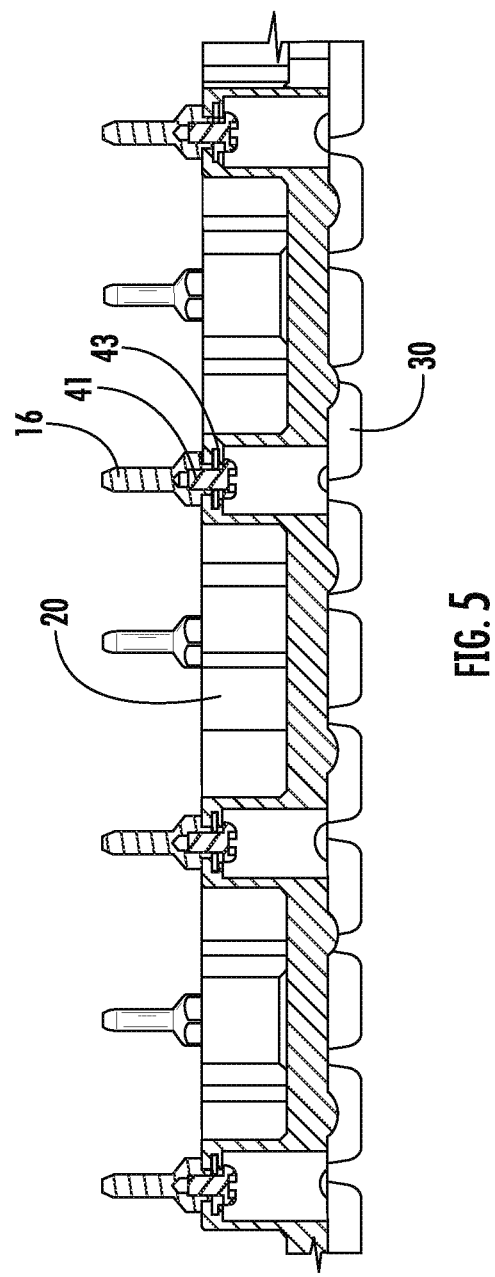
FIG. 5 is a cross-sectional side view of a track belt segment.
Figure 6:
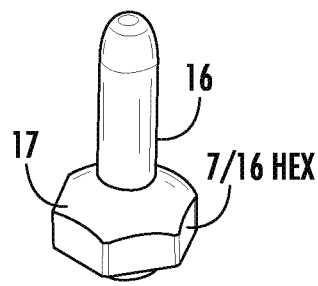
FIG. 6 is a perspective view of a straight stud.
Figure 7:
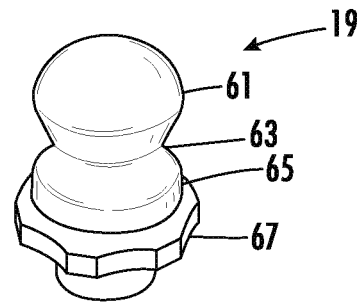
FIG. 7 is a perspective view of a round head stud.
Figure 8:
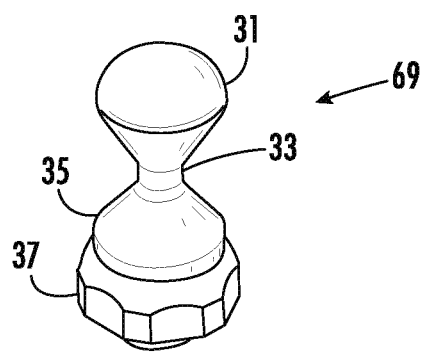
FIG. 8 is a perspective view of a cone shaped stud.

Various tips or studs 16, designed for attachment on top of a stump 12, are disclosed. One basic type is a stud 16 formed integral with a threaded hex nut 17, illustrated in FIG. 6, wherein the hex nut is 7/16 inch. FIG. 7 illustrates a round stud 19 having a head portion 61, neck portion 63, and an enlarged base 65 with a 7/16 inch threaded hex nut 67. FIG. 8 illustrates a cone shaped stud 69 having a head portion 31, a cone shaped neck portion 33, and a cone shaped base 35 with a 7/16 inch threaded hex nut 37. As illustrated in FIG. 5, the stud 16 is attached to the stump 12 with a screw 41 and washer 43. Another example is when the stump that is designed for attachment is formed from a different material, such as a steel spike, that can withstand more wear and include more articulated shapes. The attached stud may be attached with a screw or fastener, or insert molded in as the track is formed.

Simple cylindrical studs can work, but the articulated shapes improve performance. When using a simple cylindrical stud, it is preferred that they slope as the stump bends. The angle they form with the net pushes the net away prior to release. When push away from the net force is high and not desirable for a domed stud tip to enter the net opening followed by a reduced lower cone shape to hold the net better. The effect is like a button in a hole with a sloped area for design specific release.

Effectively, the instant invention forces the net cleaner into the net to be cleaned. The force pushes the top end of the stud to protrude into the net openings to engage and advance the net cleaner as the track is propelled forward. Underwater driving loads increase with cleaning speeds of up to 3 feet per second, and the stump bends slightly as the cleaner moves forward at higher speeds. Also, there are increased loads on the stumps and studs during turns, entanglement, collision or the like. Under the higher loads, the stump will slope and the net will slide off the stud as designed, preventing net damage. The tips will also affect pushing the net away at a tangential force that may or may not be desirable.

When the tangential force is not desirable, or more force is required, a more articulated tip for the stump 12 is desirable. A larger rounded first entry end from 0.25 to 0.5 inches outer diameter is used to enter the net opening with a sloped shape from the outer diameter toward the axis of the part, producing a cone shape from the rounded first end diameter, extending and ending at approximately 0.125 inches. Slopes from 15 to 45 degrees have been used. This design gives a more positive force on the net with a specific sudden release.

Figure 4:
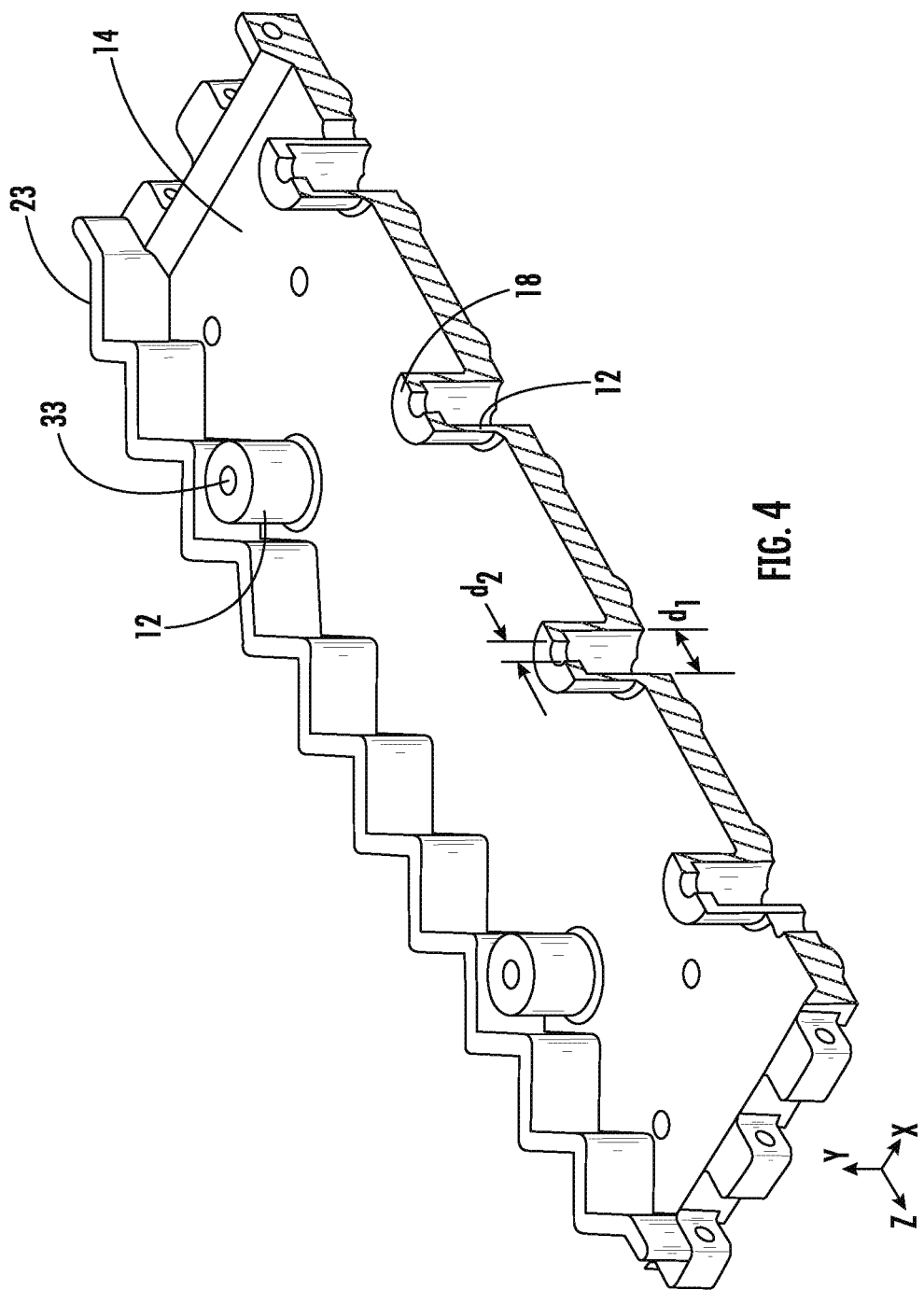
FIG. 4 is a cut-away view of a track belt segment.

The rigidness of the stump, shape of the stud, specifications and shape of the net, and number of features on the track determine the traction of the track. FIG. 4 shows current features tested, including a stump 12 that is 0.75-1.0 inches tall h1 with a hollow inside diameter d1 of 0.375 inch, 0.125 short of the extended end and a 0.125 inch d2 thru hole 33 to allow attachment of the tip with a screw. The finished stud appears similar to the top of a bowling pin or chess pawn. In FIG. 2, multiple segments are depicted with the stump 12 and stud 16 with a 1.25 inches total length; alternate designs are for use with different nets. Designs that have been successful have ranged from a straight vertical stud with pull power of 4-5 pounds force each, to articulated studs with an angle from vertical of 22 degrees with a pulling force of 9 to 12 pounds each. Studs engaging the net from 8-20 pounds have been useful to move a neutral buoyancy cleaner to sufficient speeds. Current limited production is produced in segments of approximately 12 inches in length connected together in a hinge type design.

Referring now to FIGS. 9-14, set forth is an embodiment depicting construction of the segment with reinforcement. It is noted that elastomers used to make a track belt are often reinforced with belts of nylon, steel or other high tensile material to control stretching of the elastomer or creep. In this embodiment, the drive system consists of belt segments 110 that are coupled together to form a continuous track belt with reinforcing straps 140 formed integral with the segment 110. Each segment 110 employs a plurality of elastic engagement stumps 112 protruding from a base member 114 with studs 116 mounted on a distal end 118 of the stumps 112. The base member 114 uses the elastomeric stumps 112 to advance the net cleaning machine by being flexible, eliminating the chance of tearing the net. The stumps 112 engage the net, not shown, providing underwater traction to propel a net cleaner. The stumps 112 flex to insure that, if excessive pressure is applied to the stud 116, the stump will bend and the net will release without damage. Guards 120 provide spacing to prevent the stumps 112 from engaging a cage net.

Figure 12:
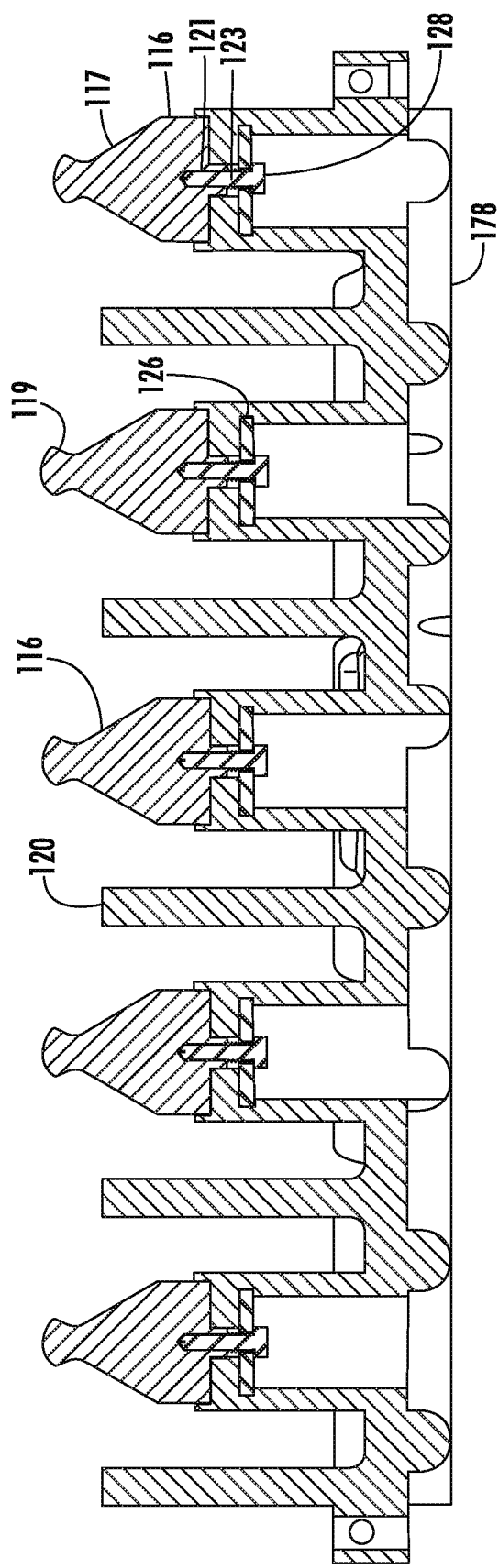
FIG. 12 is a cross-sectional view of a track belt segment with studs.
Figure 13:
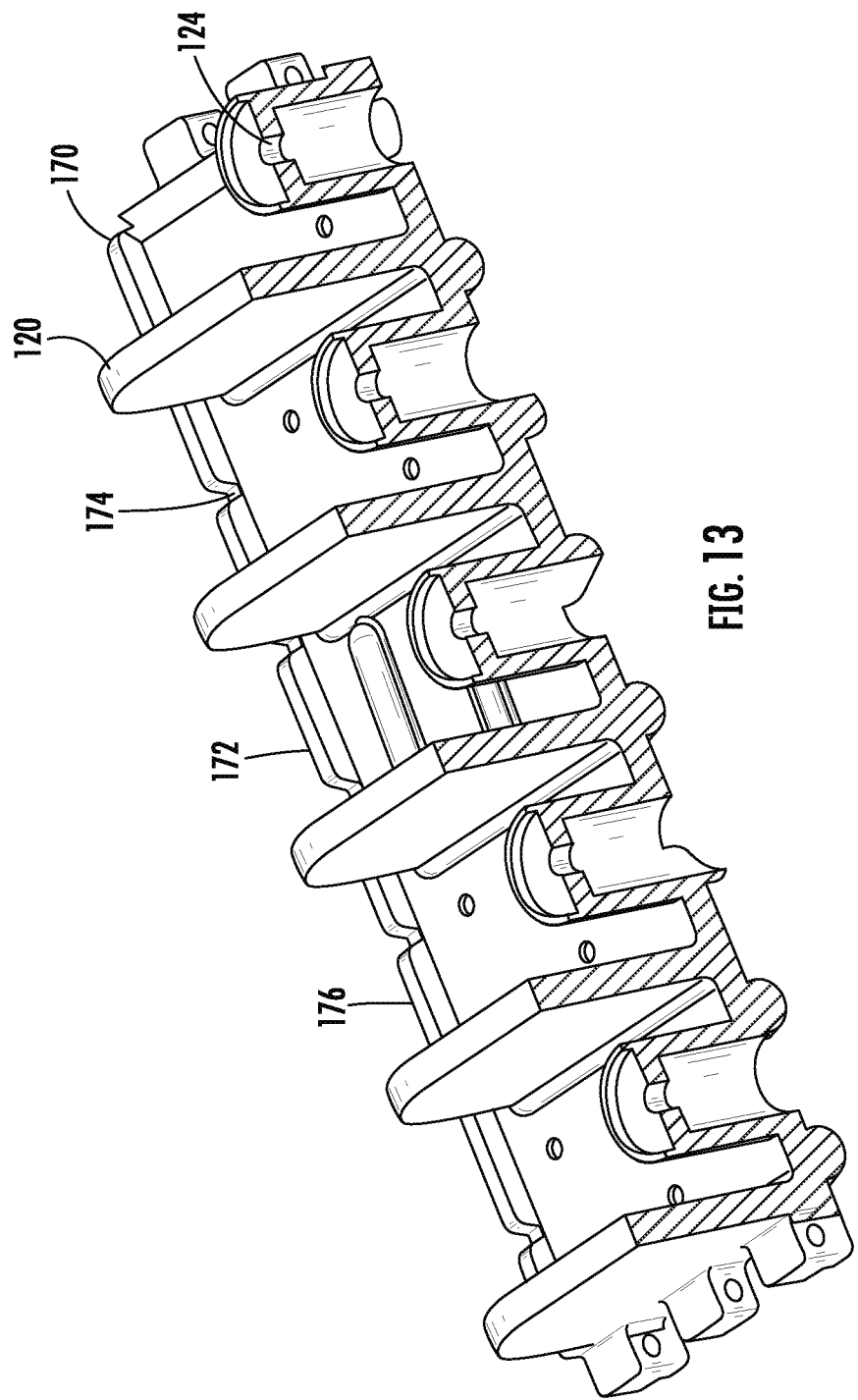
FIG. 13 is a cross-sectional view of a track belt segment without studs.
Figure 14:
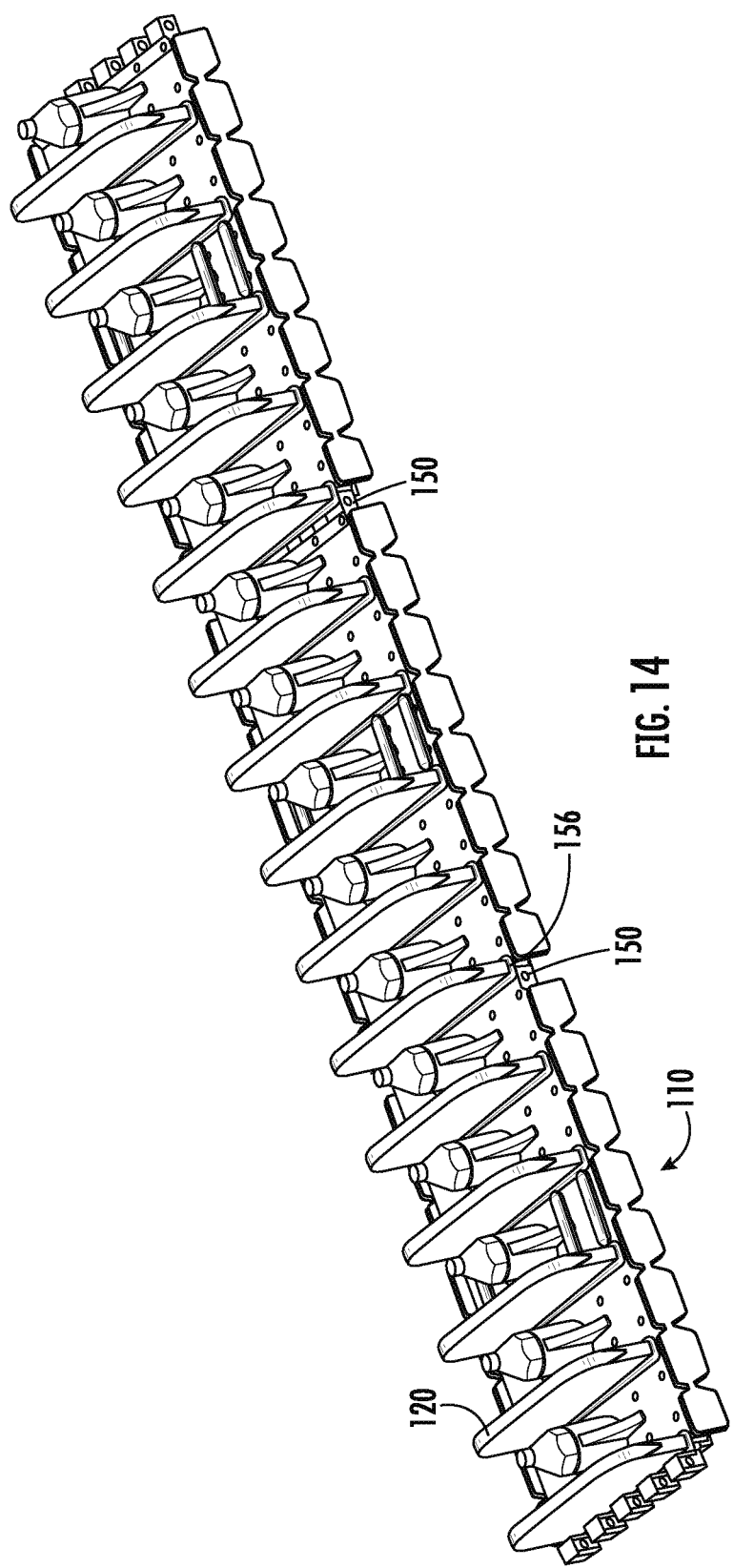
FIG. 14 is a perspective view of three adjoining track belt segments.

In this embodiment, each stump 112 is produced from 70 to 90 A shore durometer polyurethane, and will bend at a design load to prevent net damage. The guards 120 protruding from the base member 114 of the belt segment 110 have a height slightly less than the height of each stud 116, as depicted in FIG. 12. Each stud 116 has a capped head 119 extending to a conical shaped base 117, and is securable to the stump 112 by a receptacle 121 that engages a threaded shank 123 secured to the stump 112. The guards 120 prevent the net from a position lower than the stump 112 and assure that higher than design loads cannot be transferred to the net. Features attached to, or produced with, the stud 116 may be elastomeric, metal, plastic or other suitable feature to engage and act to give traction. In the preferred embodiment, the features are tips that can be made of various shapes, and the guards 120 prevent the net from engaging the stumps 112. In one embodiment, the distal end 118 of the stumps 112 have an aperture 124 for passage of the shank 123, wherein the shank 123 may include a head 128 for use in fastening and a washer 126 to prevent passing the head 128 through the aperture 124.

Figure 9:
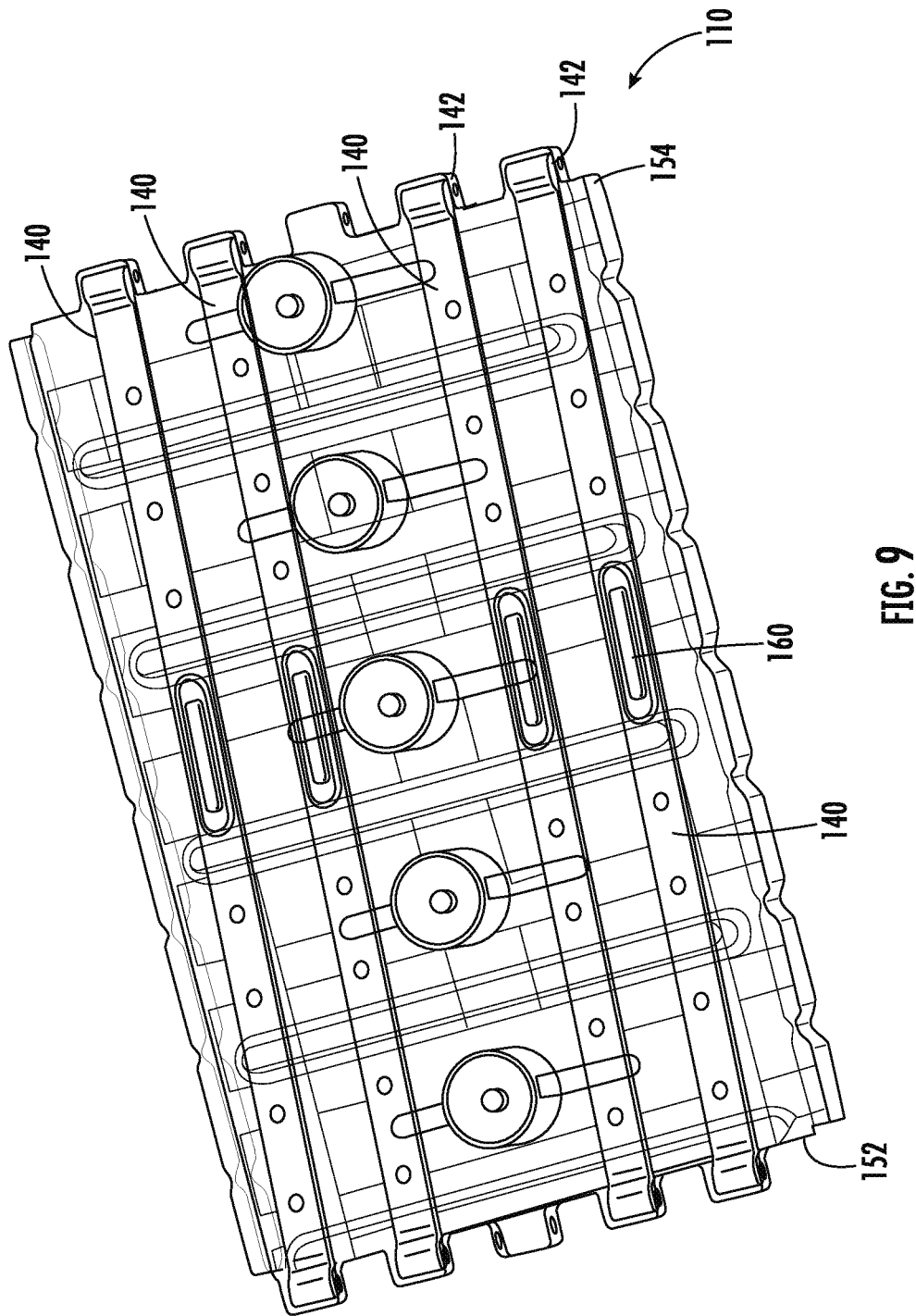
FIG. 9 is a cross-sectional top view of an alternative embodiment of a track belt segment.
Figure 10:
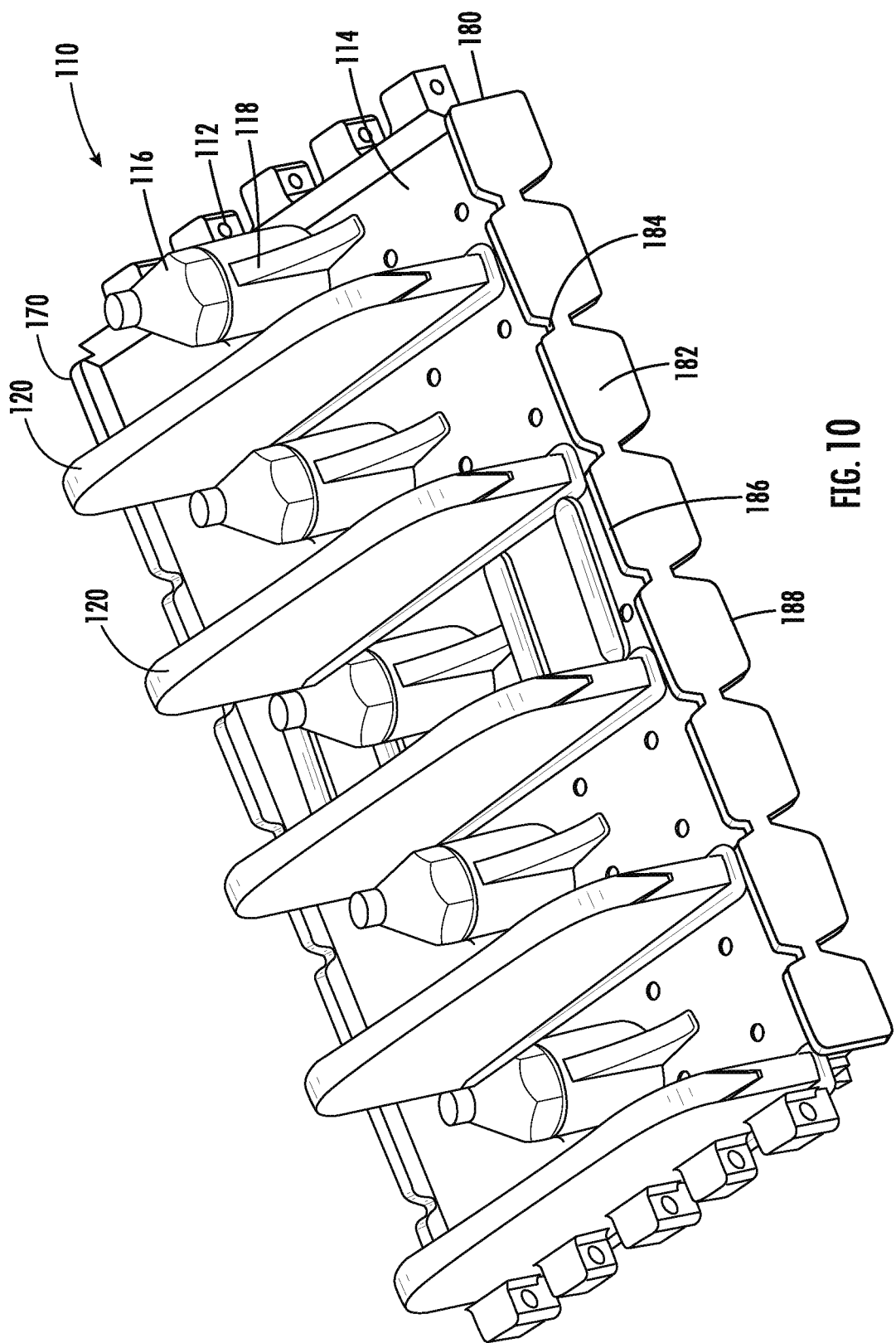
FIG. 10 is a perspective view thereof.
Figure 11:
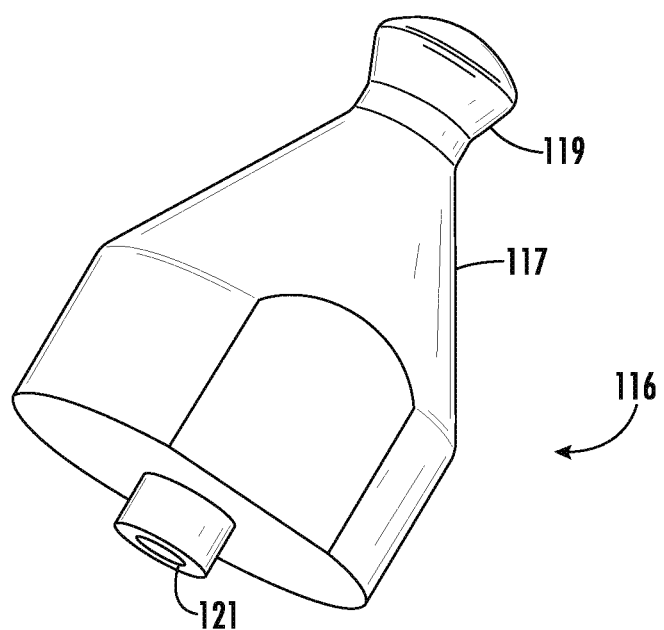
FIG. 11 is a perspective view of a stud.

The base member 114 includes reinforcing straps 140 that are inserted in the mold of the base member 114 in a manner that will encompass connector pins 150. The reinforcing straps 140 create surround the apertures 142 that are constructed and arranged to receive a connector pin 150. The strap 140 is wrapped around the connector pins 150 at both the first end 152 and the offset second end 154, each with sufficient length for the ends of the strap 140 to meet and attach at a connection point 160, forming a continuous belted length. With one or more straps 140 installed, the mold can be filled with an elastomeric material, such as polyurethane. The mold contains 3/16 inch diameter rods to create a cavity in the finished part for the inserting of a 3/16 inch connector pin 150; the connector pin 150 to include threaded ends to accept a fastener nut 156 to make segment attachment continuous. With the connection point 160 being sufficiently distanced from the connector pin 150, the molding material grips the strap 140 sufficiently, so that the stress at the holes 142 is very low, thereby preventing failure, namely the loss of an adjoining segment. The current design utilizes several belts, such that the attachment pin in the assembled track is in shear at several points, creating a strong attachment; the belt is constructed from a flexible high tensile material; the segment is molded from liquid elastomers like urethane, or other elastomers and processes. The belts are sloped, as illustrated in FIG. 9, such that only one mold is necessary to form male and female connecting segments 110.

The edge of the base member 114 having a first track guide 170 is formed from a plurality of peaks 172 and valleys 174 on a top edge 176 and a bottom edge 178, allowing flexibility as the base member is rotated around a curve and engages the drive wheel track. The edge of the base member 114 also has a second track guide 180 having a plurality of peaks 182 and valleys 184 on a top edge 186 and a bottom edge 188, allowing flexibility as the base member is rotated around a curve.

Referring to FIGS. 15-18, the continuous track belt drive system 200 is used to advance a net cleaner, not shown, on a fish cage net using the belt segments 110 coupled together by the connector pins 150, and wrapped around at least one driving wheel 202 and an opposite wheel 204. The drive wheel 202 is rotated by the drive motor 206, while the opposite wheel 204 need only provide reversal of track belt direction. Each segment of the track belt includes a plurality of flexible stumps 112 protruding from the base member 114, with studs 116 located on the distal end 118 of the stumps 112. The guards 120 protrude from the base member 114 of the belt segment 110, having a height slightly less than the height of each stump stud 116, as illustrated in FIG. 17. As previously stated, the guards 120 are constructed and arranged to prevent the net from falling into a position lower than the protruding portion of the stump 112 to assure that higher than design loads cannot be transferred to the net. It is imperative that the drive system does not tear a net. A tear in a net can quickly result in loss of fish through either escape or predator entrance.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A track belt drive system used to advance a net cleaner on a fish cage net, said track belt comprising:
   a plurality of belt segments coupled together forming a continuous track belt;
   a drive wheel spaced apart from an opposite wheel, said drive wheel coupled to a motor used to rotate said continuous track belt around said opposite wheel;
   at least one flexible stump protruding from said driving track belt with net engagement features attached to each said stump for engaging and advancing said net cleaner;
   and a guard to prevent engaging said fish cage net with said flexible stump.

2. The track belt drive system according to claim 1 wherein said guard is about the same height of said flexible stump.

3. The track belt drive system according to claim 1 wherein said guard is segmented.

4. The track belt drive system according to claim 1 wherein said guard is not essentially straight.

5. The track belt drive system according to claim 1 wherein said flexible stumps are made of an elastomer between 70 and 90 Shore A durometer.

6. The track belt drive system according to claim 1 wherein said flexible stumps are constructed from an elastomer material.

7. The track belt drive system according to claim 1 wherein said track belt is constructed from an elastomeric material.

8. The track belt drive system according to claim 1 wherein features attached to said flexible stump have a curved first shape and a reduced radius adjacent, forming a cone shape.

9. The track belt drive system according to claim 1 wherein said flexible stump folds over about 45 degrees at 2-10 lbs. of force.

10. The track belt drive system according to claim 1 wherein said stump can be selected from either an elastomeric material or a spring.

11. A track belt for use with a fish cage net cleaner, said track belt comprising:
    a plurality of belt segments, each belt segment having a first end with connectors for receipt of a first connecting pin, and a second end with offset connectors for receipt of a second connecting pin;
    a plurality of flexible stumps formed integral with each said belt segment;
    a stud releasably securable to each said stump;
    a guard member having a height above the surface of said belt segment equal to or greater than the height of said flexible stumps; and
    a belt formed integral with said belt segment extending around each said first end connector and said second end connector, said belt ends centrally located from said end connectors;
    wherein each said stud includes a shape constructed and arranged to engage a net and advance said belt segment, and stress on a belt distributing connecting pin is lowered by spacing said first connector pin a sufficient distance from said second connector pin.

12. The track belt according to claim 11 wherein said belt is constructed from a flexible high tensile material.

13. The track belt according to claim 11 wherein said belt is sloped such that only one mold is necessary to form male and female connecting segments.

14. The track belt according to claim 11 wherein said flexible stumps are constructed of an elastomer having a durometer between 70 and 90 Shore A.

15. The track belt according to claim 11 wherein said stump will fold about 45 degrees at 2-10 lbs. force.

16. The track belt according to claim 11 wherein said stump can be selected from either an elastomeric material or a spring.

17. The track belt according to claim 11 wherein said stud is conical shaped, leading to a capped head.

18. The track belt according to claim 17 wherein said capped head is between 0.25 to 0.5 inches outer diameter.

19. The track belt according to claim 17 wherein said conical shape is sloped between 15 to 45 degrees.

20. The track belt according to claim 11 wherein said belt is molded within the segment and encompasses a connecting pin placed in said connectors.

21. The track belt according to claim 11 wherein each said belt has a first end secured to a second end at a distance from said connector pins, wherein the distance reduces stress on said connectors.

\* \* \* \* \*